US009216529B2

(12) United States Patent
Swinnen et al.

(10) Patent No.: US 9,216,529 B2
(45) Date of Patent: Dec. 22, 2015

(54) CHEMICAL RESISTANT AND FIRE RETARDANT POLYCARBONATE POLYESTER COMPOSITION

(75) Inventors: Ann Swinnen, Keerbergen (BE); Claude T. E. Van Nuffel, Ookstakker (BE)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 14/234,266

(22) PCT Filed: Jul. 13, 2012

(86) PCT No.: PCT/EP2012/063818
§ 371 (c)(1),
(2), (4) Date: Jan. 22, 2014

(87) PCT Pub. No.: WO2013/017395
PCT Pub. Date: Feb. 7, 2013

(65) Prior Publication Data
US 2014/0155549 A1    Jun. 5, 2014

(30) Foreign Application Priority Data

Aug. 2, 2011   (EP) .................................... 11176320

(51) Int. Cl.
| C08L 69/00 | (2006.01) |
| B29C 45/17 | (2006.01) |
| C08L 67/02 | (2006.01) |
| C08L 27/18 | (2006.01) |
| C08L 51/08 | (2006.01) |
| C08L 101/04 | (2006.01) |

(52) U.S. Cl.
CPC ............ B29C 45/1701 (2013.01); C08L 67/02 (2013.01); C08L 69/00 (2013.01); C08L 27/18 (2013.01); C08L 51/085 (2013.01); C08L 101/04 (2013.01); *C08L 2205/035* (2013.01)

(58) Field of Classification Search
None
See application file for complete search history.

(56) References Cited

U.S. PATENT DOCUMENTS

| 2,465,319 | A | 3/1949 | Whinfield |
| 3,028,365 | A | 4/1962 | Hermann |
| 3,047,539 | A | 7/1962 | Pengilly |
| 3,169,121 | A | 2/1965 | Goldberg |
| 3,419,634 | A | 12/1968 | Vaughn, Jr. |
| 3,431,224 | A | 3/1969 | Goldblum |
| 3,756,986 | A | 9/1973 | Russell |
| 4,156,069 | A | 5/1979 | Kesten et al. |
| 4,260,731 | A | 4/1981 | Mori et al. |
| 4,401,804 | A | 8/1983 | Wooten et al. |
| 4,529,791 | A | 7/1985 | Glass |
| 4,532,290 | A | 7/1985 | Jaquiss et al. |
| 4,677,162 | A | 6/1987 | Grigo et al. |
| 4,888,388 | A | 12/1989 | Hongo et al. |
| 4,963,619 | A | 10/1990 | Wittmann et al. |
| 5,087,663 | A | 2/1992 | Laughner |
| 5,124,402 | A | 6/1992 | Laughner et al. |
| 5,189,091 | A | 2/1993 | Laughner |
| 5,262,476 | A | 11/1993 | Laughner |
| 5,369,154 | A | 11/1994 | Laughner |
| 5,461,092 | A | 10/1995 | Laughner |
| 5,922,816 | A | 7/1999 | Hamilton |
| 2,981,661 | A | 11/1999 | Jun |
| 5,981,661 | A | 11/1999 | Liao et al. |
| 6,350,850 | B1 * | 2/2002 | Ueda et al. ..................... 528/283 |
| 6,673,463 | B1 * | 1/2004 | Onishi et al. .................. 428/480 |
| 6,696,541 | B1 * | 2/2004 | Sakurai et al. ................ 528/196 |
| 6,727,301 | B1 | 4/2004 | Eckel et al. |
| 6,767,943 | B1 | 7/2004 | Eckel et al. |
| 7,223,812 | B2 | 5/2007 | Seidel et al. |
| 7,645,850 | B2 | 1/2010 | Freitag |
| 2004/0010080 | A1 * | 1/2004 | Hutter et al. ................... 524/832 |
| 2004/0014887 | A1 * | 1/2004 | Lee ................................. 525/94 |
| 2004/0198907 | A1 * | 10/2004 | Ohishi et al. .................... 525/64 |
| 2005/0085589 | A1 | 4/2005 | Kim |

(Continued)

FOREIGN PATENT DOCUMENTS

| EP | 2204418 A1 | 7/2010 |
| EP | 2377899 A1 | 10/2011 |

(Continued)

OTHER PUBLICATIONS

Search Report and Written Opinion for application No. PCT/EP2012/063818 dated Sep. 17, 2012.
Yanagase et al., Silicone-Based Impact Modifiers for Poly(vinyl chloride), Engineering Resins, and Blends, Journal of Polymer Science: Part A: Polymer Chemistry, 2004, 1112-1119, vol. 42, Wiley Periodicals, Inc.
Virex II 256 Super Concentrate Disinfectant Cleaner, Material Safety Data Sheet, Apr. 19, 2000, Johnson Wax Professional, Sturtevant, WI.

(Continued)

*Primary Examiner* — Jeffrey Mullis
(74) *Attorney, Agent, or Firm* — The Dobrusin Law Firm, P.C.

(57) ABSTRACT

A composition comprising a blend of: a) one or more polycarbonates; b) one or more polyesters; c) one or more core shell rubbers having glycidyl groups on the surface of the core; and d) one or more halogenated fire retardant agent; wherein the polycarbonates and polyesters form separate phases and the core shell rubber is located in the polyester phase. The compositions may further comprise a fluoropolymer capable of functioning as an anti-drip agent. The compositions exhibit a flame retardant rating according to UL-94 at V-0 of 3.0 mm or less; a notched Izod impact strength of about 8 foot pounds per inch or greater (0.90 joules) and chemical resistance to one or more of the common cleaning compositions selected from bleach, polyethylene glycol, a mixture of aryl substituted phenols and aryl substituted chlorophenols, a mixture of an alkanol and a monoalkyl ether of ethylene glycol, and one or more ammonium chlorides.

19 Claims, No Drawings

(56) References Cited

U.S. PATENT DOCUMENTS

| | | |
|---|---|---|
| 2007/0155857 A1 | 7/2007 | Lee et al. |
| 2008/0027167 A1* | 1/2008 | Vollenberg et al. ............ 524/505 |
| 2008/0090961 A1 | 4/2008 | Li et al. |
| 2009/0030171 A1* | 1/2009 | Leenders et al. .............. 528/196 |
| 2009/0198010 A1 | 8/2009 | Eckel et al. |
| 2009/0286921 A1* | 11/2009 | Vaze et al. .................... 524/537 |
| 2010/0204390 A1 | 8/2010 | Hayata et al. |
| 2014/0364541 A1* | 12/2014 | Lyons et al. ................. 523/453 |

FOREIGN PATENT DOCUMENTS

| | | |
|---|---|---|
| JP | 1266166 A | 10/1989 |
| JP | 6107939 A1 | 4/1994 |
| JP | 2002/069285 A | 3/2002 |
| JP | 2004/110345 A | 8/2004 |
| JP | 2004/225212 A | 8/2004 |
| JP | 2002/225283 A | 8/2008 |
| WO | 92/03504 A1 | 3/1992 |
| WO | 2008/127286 A2 | 10/2008 |
| WO | 2009/037974 A1 | 3/2009 |
| WO | 2011/128119 A1 | 10/2011 |
| WO | 2011/130754 A1 | 10/2011 |
| WO | 2013/017395 A1 | 2/2013 |

OTHER PUBLICATIONS

Cavicide, Material Safety Data Sheet, Aug. 31, 1999, Metrex Research Corporation, Parker, CO.

WEX-CIDE-128, Material Safety Data Sheet, Oct. 2, 2007, Wexford Labs, Inc., Kirkwood, MO.

CIDEXPLUS 28 Day Solution, Material Safety Data Sheet, May 21, 2007, Advanced Sterilization Products, Irvine, CA.

Activator for CIDEXPLUS 28 Day Solution, Material Safety Data Sheet, May 21, 2007, Advanced Sterilization Products, Irvine, CA.

CIDEX OPA Solution, Material Safety Data Sheet, Oct. 1, 2007, Advanced Sterilization Products, Irvine, CA.

Chinese office action for Chinese Application No. 201180018615.1 dated Jan. 22, 2014.

* cited by examiner

CHEMICAL RESISTANT AND FIRE RETARDANT POLYCARBONATE POLYESTER COMPOSITION

CLAIM OF PRIORITY

This application is a National Phase Application of serial number PCT/EP2012/063818, filed on Jul. 13, 2012, which claims benefit of European application serial number 11176320.7 filed on Aug. 2, 2011, which are both hereby entirely incorporated by reference for all purposes.

FIELD OF THE INVENTION

The present invention relates to carbonate blend compositions comprising one or more polycarbonates, one or more polyesters, one or more graft (co)polymers having a core-shell morphology and glycidyl groups on the surface of the shell and one or more halogenated fire retardants. The invention further relates to methods to prepare these compositions. The carbonate blend composition further demonstrate an excellent blend of properties including improved solvent resistance, impact properties, heat resistance, and fire retardant properties. The carbonate blend composition is particularly suited for use in molded articles used for medical applications.

BACKGROUND OF THE INVENTION

Polycarbonate (PC) and blends of polycarbonate with acrylonitrile, butadiene, and styrene terpolymer (PC/ABS) have found many uses in general, and specifically in medical devices, because polycarbonate combines a high level of heat resistance, transparency, good impact resistance, and it is easily molded. However, the prevalence of hospital acquired infections (HAI) requires medical devices to be exposed to a variety of commonly used cleaning liquids and polycarbonate, even blended with ABS, can suffer from a tendency to craze and crack under the effects of residual molded-in stresses, especially when contacted with such cleaning solutions. Polycarbonate which has crazed is, undesirably, more likely to experience brittle rather than ductile failure. This disadvantage has been somewhat relieved by the practice of blending polycarbonate with various substances such as the olefin polymers polyethylene, polypropylene, polyisobutylene, polyphenyleneoxide, or polyester as described for example in U.S. Pat. Nos. 3,431,224; 5,189,091; 5,262,476; 5,369,154; and 5,461,092. These added substances are capable of improving the resistance of polycarbonate to solvents, but they tend to cause an offsetting reduction in impact resistance and weldline strength of the blended composition. Additionally, it is frequently found that when the polycarbonate is modified with substances such as polyolefins, the added substances tend to separate in the blend from the polycarbonate and delaminate as evidenced by peeling or splintering. Commonly owned patent application PCT/EP 2011/002048 titled CARBONATE BLEND COMPOSITION HAVING IMPROVED RESISTANCE TO ENVIRONMENTAL STRESS CRACKING describes a polycarbonate blend having the purpose of improving the environmental stress crack resistance (ESCR) thereof (e.g. chemical resistance) which also does not deleteriously affect its impact strength and weldline strength, and cause delamination as evidenced by peeling or splintering.

Many articles that are prepared from polycarbonate based blends are required to exhibit fire retardant properties. Many known fire retardant compounds commonly utilized in polycarbonate blends degrade other desirable properties of such blends such as chemical resistance (resistance to environmental stress cracking), impact properties and heat resistance. What are needed are polycarbonate blends with good fire retardant properties, good chemical resistance (resistance to environmental stress cracking), impact properties and heat resistance.

SUMMARY OF THE INVENTION

The present invention meets one or more of the above needs and in one embodiment is a composition comprising: a) one or more polycarbonates; b) one or more polyesters; c) one or more core shell rubbers having glycidyl groups on the surface of the core; and d) one or more halogenated fire retardant agent; wherein the polycarbonates and polyesters form separate phases and the core shell rubber is located in the polyester phase. Generally the compositions of this invention are blends of the recited elements. In another embodiment the compositions further comprise a fluoropolymer capable of functioning as an anti-drip agent. Preferably the compositions of the invention exhibit a flame retardant rating according to UL-94 at V-0 of 3.0 mm or less; a notched Izod impact strength of about 8 foot pounds per inch (0.90 joules) or greater and chemical resistance to one or more of the common cleaning compositions selected from bleach, polyethylene glycol, a mixture of aryl substituted phenols and aryl substituted chlorophenols, a mixture of an alkanol and a monoalkyl ether of ethylene glycol, and one or more ammonium chlorides having four alkyl and/or aryl ligands. At least a portion of the glycidyl groups on the surface of the core shell rubbers may be reacted with functional groups of the one or more polyesters.

In another embodiment the invention comprises molded articles prepared from the compositions of the invention. A method of preparing a molded article comprising passing a composition according to the invention through a zone with shearing at a temperature of about 150° C. to about 400° C. and molding the resulting mixture into a desired shape.

The composition of the invention are useful in preparing fabricated articles or shaped articles: medical applications such as connectors, valves, surgical instruments, trays, lab ware, diagnostics, drug delivery housings, external defibrillators, patient monitoring devices, medical imaging devices, diagnostic equipments, respiratory housings, hospital bed frames and components, interior trim for rail vehicles, interior and exterior automotive applications, enclosures for electrical devices containing small transformers, enclosures for information dissemination and transmission devices, enclosures and cladding for medical purposes, massage devices and enclosures therefore, toy vehicles for children, sheet wall elements, enclosures for safety equipment, hatchback spoilers, thermally insulated transport containers, apparatus for keeping or caring for small animals, articles for sanitary and bathroom installations, cover grilles for ventilation openings, articles for summer houses and sheds, and enclosures for garden appliances. Preferred fabricated articles include housings or enclosures such as for: power tools, appliances, consumer electronic equipment such as TVs, VCRs, DVD players, web appliances, electronic books, etc., or housings or enclosures such as for: information technology equipment such as telephones, computers, monitors, fax machines, battery chargers, scanners, copiers, printers, hand held computers, flat screen displays, etc and the like. The resulting compositions and articles manufactured therefrom exhibit with good fire retardant properties, good chemical resistance (resistance to environmental stress cracking), impact properties and heat resistance.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention generally relates to blends of polycarbonate containing polymers, polyesters, core shell rubbers having glycidyl groups on the surface of the shell and halogenated fire retardants. Such blends can be used in a variety of molded articles. The molded articles can be prepared utilizing a number of well known manufacturing processes.

Polycarbonate as used herein means a polymer containing carbonate units. Such polymers may be homopolymers consisting essentially of carbonate monomer units or copolymers containing one or more other monomer units (co-monomer units). Such copolymers may be block copolymers containing two or more blocks of different monomer units or may be random copolymers with the different monomer units randomly located along the polymer backbone. The other monomer units may comprise any monomer units that do not negatively impact the inherent properties of polycarbonates, for instance heat resistance, impact resistance, moldability and transparency, where required for the intended use. Among exemplary comonomer units are ester units and polysiloxane units. Among preferred co-monomer units are esters and polysiloxane units. The amount of carbonate monomer units in copolycarbonates is selected such that the resulting polymer retains the desirable properties of polycarbonates, for instance heat resistance, impact resistance, moldability and transparency, where required for the intended use. Preferably the copolycarbonates contain about 75 mole percent or greater carbonate monomer units, more preferably about 80 mole percent or greater carbonate monomer units and most preferably about 85 mole percent or greater carbonate monomer units. Preferably the copolycarbonates contain about 99 mole percent or less carbonate monomer units, more preferably about 97 mole percent or less carbonate monomer units and most preferably about 95 mole percent or less carbonate monomer units. Preferably the copolycarbonates contain about 1 mole percent or greater co-monomer monomer units, more preferably about 3 mole percent or greater co-monomer monomer units and most preferably about 5 mole percent or greater co-monomer monomer units. Preferably the copolycarbonates contain about 25 mole percent or less co-monomer monomer units, more preferably about 20 mole percent or less co-monomer monomer units and most preferably about 15 mole percent or less co-monomer monomer units. Preferably the polycarbonate units contain aromatic units in the backbone of the polymer.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols. Diphenols for the production of the aromatic polycarbonates and/or aromatic polyester carbonates preferably correspond to formula I

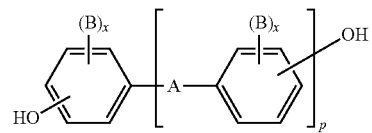

wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO$_2$—, or a $C_6$-$C_{12}$ arylene, on to which other aromatic rings, which optionally contain hetero atoms, can be condensed, or a radical of formula II or III:

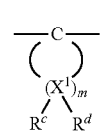

II

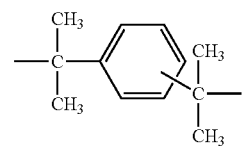

III

B in each case is independently hydrogen, a $C_1$-$C_{12}$ alkyl, preferably methyl, or a halogen, preferably chlorine and/or bromine;
x in each case is mutually independently 0, 1, or 2;
p is 0 or 1;
$R^c$ and $R^d$ are mutually independent of each other and are individually selectable for each $X^1$ and are hydrogen or a $C_1$-$C_6$ alkyl, preferably hydrogen, methyl or ethyl;
$X^1$ denotes carbon; and
m denotes an integer from 4 to 7, preferably 4 or 5, with the proviso that Re and $R^d$ simultaneously denote an alkyl on at least one $X^1$ atom.

The preferred diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyphenyl) ethers, bis(hydroxyphenyl)sulfoxides, bis(hydroxyphenyl) ketones, bis(hydroxyphenyl)sulfones and 4,4"-bis(hydroxyphenyl)diisopropylbenzenes, as well as derivatives thereof which have brominated and/or chlorinated nuclei. Diphenols which are particularly preferred are 4,4'-dihydroxybiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane, 2,2- bis-(4-hydroxyphenyl)propane (bisphenol A) is particularly preferred. The diphenols can be used individually or as arbitrary mixtures. The diphenols are known from the literature or can be obtained by methods known from the literature. Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

Examples of suitable chain terminators for the production of the aromatic polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, exemplary are 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used is generally about 0.1 mole percent or greater based on the molar sum of the diphenols used in each case. The amount of chain terminators used is generally about 10 mole percent or less based on the molar sum of the diphenols used in each case.

The aromatic polycarbonates can be branched in the known manner, for example by the incorporation of about 0.05 to about 2.0 mole percent, with respect to the sum of the diphenols used, of trifunctional compounds or of compounds with a functionality higher than three, for example those which contain three or more phenolic groups. Branched polycarbonates suitable for the present invention can be prepared by known techniques, for example several suitable methods are disclosed in U.S. Pat. Nos. 3,028,365; 4,529,791; and 4,677,162; which are hereby incorporated by reference in their entirety. Suitable branching agents that may be used are tri- or multi-functional carboxylic acid chlorides, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of about 0.01 to about 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)benzene, 1,1,1-tris(4-hydroxyphenyl)ethane, tris(4-hydroxyphenyl)-phenylmethane, 2,2-bis[4,4-bis(4-hydroxyphenyl)cyclohexyl]-propane, 2,4-bis[1-(4-hydroxyphenyl)-1-methylethyl] phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of about 0.01 to about 1.0 mole percent with respect to the diphenols used. Phenolic branching agents can be placed in the reaction vessel with the diphenols. Acid chloride branching agents can be introduced together with the acid chlorides.

Copolycarbonates may be prepared by known processes in the art. In one exemplary embodiment, about 1 to about 25 parts by weight, preferably about 2.5 to about 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature. In another embodiment ester forming monomers may be utilized in the polycarbonate containing polymer preparation process. Exemplary ester forming monomers include dicarboxylic acid halides and hydroxycarboxylic acids. The preferred aromatic dicarboxylic acid dihalides for the production of the aromatic polyester carbonates are the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic in a ratio from about 1:20 to about 20:1 are particularly preferred. A carbonic acid halide, preferably phosgene, is used in conjunction as a Bifunctional acid derivative during the production of the polyester carbonates. The aromatic polyester carbonates may also contain incorporated hydroxycarboxylic acids. The aromatic polyester carbonates may be either linear or may be branched. Suitable branching agents are disclosed hereinabove.

Apart from the aforementioned monophenols, suitable chain terminators for the production of the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator is about 0.1 to about 10 mole percent in each case, with respect to the moles of diphenols in the case of phenolic chain terminators and with respect to the moles of dicarboxylic acid dichlorides in the case of monocarboxylic acid chloride chain terminators.

The blends of the invention may contain one or more polymers containing carbonate monomer units. The one or more polymers containing carbonate monomer units can comprise polycarbonates, co-polycarbonates or blends of polycarbonates and co-polycarbonates. The polycarbonates and/or co-polycarbonates of the present invention preferably exhibit a mean weight average molecular weight sufficient to provide the desired properties to articles prepared from the polycarbonates and/or co-polycarbonates as described hereinbefore. The polycarbonates and/or co-polycarbonates of the present invention preferably have a mean weight average molecular weights of about 8,000 or greater, preferably about 15,000 or greater and more preferably about 30,000 or greater. The polycarbonates and/or co-polycarbonates of the present invention preferably have a mean weight average molecular weights of about 200,000 or less, preferably about 80,000 or less, more preferably about 40,000 or less. Unless otherwise indicated, the references to polycarbonate and/or co-polycarbonate "molecular weight" herein refer to weight average molecular weights ($M_w$) determined by gel permeation chromatography (GPC) using laser scattering techniques with a bisphenol A polycarbonate standard and is given in units of grams per mole (g/mole). Preferably, the melt flow rate (MFR) of the polycarbonate and/or co-polycarbonate is sufficient to allow use of the blends to prepare desired articles therefrom. Preferably the melt flow rate is from about 3 to about 20 grams per 10 minutes (g/10 min) as determined at 300° C. under a load of 1.2 kg.

The polycarbonates and/or co-polycarbonates are utilized in the blend in a sufficient amount to provide articles prepared therefrom a high level of heat resistance, impact resistance, moldability and transparency where desired. Preferably the polycarbonate containing polymer is a continuous phase in the blend. Preferably the one or more polycarbonates and/or co-polycarbonates are preferably present in an amount of about 5 percent by weight or greater based on the weight of the composition of the invention, more preferably about 25 percent by weight or greater and most preferably about 30 percent by weight or greater. Preferably the one or more polycarbonates and/or co-polycarbonates are preferably present in an amount of about 95 percent by weight or less based on the weight of the composition of the invention, more preferably about 85 percent by weight or less and most preferably about 75 percent by weight or less.

The composition of the invention contains one or more polyesters. Any polyester that improves the resistance of the composition or articles prepared therefrom to damage due to exposure to chemicals may be utilized in the invention. In many embodiments the one or more polyesters and the one or more polycarbonates form separate phases. In a preferred embodiment the polyester is a discontinuous phase. Preferably the polyester are aromatic polyesters. Exemplary reactants for making the polyester useful in this invention, include hydroxycarboxylic acids, and diols and dicarboxylic acids either or both of which can be aliphatic or aromatic. Among exemplary polyesters are poly(alkylene alkanedicarboxylates), poly(alkylene phenylenedicarboxylates), poly(phenylene alkanedicarboxylates), and poly(phenylene phenylenedicarboxylates). Alkyl portions or the polymer chains can be substituted with, for example, halogens, alkoxy groups or alkyl side chains and can contain divalent heteroatomic groups (such as —O—, —S— or —$SO_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms. Typical alkylene diols used in ester formation are the $C_2$ to $C_{10}$ glycols, such as ethylene-, propylene-, and butylene glycol. Alkanedicarboxylic acids frequently used are oxalic acid, adipic acid and sebacic acid. Dials which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, ciphenyletherdicarboxylic acid, diphenyldicarboxylic acid, diphenylsulfonedicarboxylic acid, diphenoxyethanedicarbocylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention. For example, use of cyclohexanedimethylol together with ethylene glycol in esterification with terephthalic acid forms a clear, amorphous copolyester (PETG) of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl. Aromatic polyesters such as the poly(alkylene phenylenedicarboxylates), polyethylene terephthalate (PET) and polybutylene terephthalate (PBT), or mixtures thereof, are particularly useful in this invention.

Methods and materials useful for the production of polyesters, as described above, are discussed in greater detail in U.S. Pat. Nos. 2,465,319; 3,047,539; and 3,756,986, each of which is incorporated herein by reference. Polyesters used in this invention may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an -[AABB-]- polyester. Although the presence of a catalyst such as p-toluene sulfonic acid, a titanium alkoxide or a dialkyltin oxide is helpful, the primary driving force behind the direct esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a byproduct and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis. Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chain coupling agent, such as diphenyl carbonate, to the melt reaction mixture just prior its completion. To achieve higher weight by solid state polymerization, polyester product of intermediate weight can be heated in a vacuum or stream of inert gas, first to a temperature where it crystallizes and then to a temperature close to its melting point. Polyesters can also be produce by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 00° C., and there is no need to remove a condensation product from the reaction.

The polyesters useful in the invention preferably exhibit a crystallinity sufficient to impact the chemical resistance, heat resistance and tensile properties of the polyesters. The one or more poly esters preferably exhibit an intrinsic viscosity such that the intrinsic viscosity of the polycarbonate is matched at processing conditions. Preferably the one or more poly esters preferably exhibit an intrinsic viscosity of about 0.35 dl/g or greater. Preferably the one or more poly esters preferably exhibit an intrinsic viscosity of about 1.20 dl/g or less and more preferably about 1.10 dl/g or less. Preferably the crystallinity is about 25 weight percent or greater based on weight of the polyesters and more preferably about 30 weight percent or greater. Preferably the crystallinity is about 60 weight percent or less based on the weight of the polyesters and more preferably about weight percent or less. The one or more polyesters are present in sufficient amount to improve the chemical resistance of the blend of the composition. Preferably the one or more polyesters are preferably present in an amount of about 5 percent by weight or greater based on the weight of the composition of the invention and most preferably about 10 percent by weight or greater. Preferably the one or more polycarbonates and/or co-polycarbonates are preferably present in an amount of about 95 percent by weight or less based on the weight of the composition of the invention, more preferably about 75 percent by weight or less and most preferably about 65 percent by weight or less.

The composition of the invention further comprises a core shell polymer having reactive groups on the surface that react with the functional groups of the polyester. Any core shell rubber that improves the impact and environmental stress crack resistance properties of the composition may be utilized in the composition. Preferably the core shell rubber preferentially locates in the ester phase. Thus, core shell rubbers that preferentially locate in the ester phase are preferred for use in the compositions of the invention so as to improve the balance of the impact and the environmental stress crack resistance properties. It is preferable that the core shell rubber be miscible with the polyester. Generally a core shell rubber comprises particles having a core of elastomeric material and a shell of a protective material. The core comprises a material that improves the impact properties of the compositions the core shell rubber is included in. The core comprises a material that exhibits a low glass transition temperature. The glass transition temperature of the core is sufficiently low to improve the impact properties of the composition. Preferably the glass transition temperature is about 0° C. or less, more preferably about −25° C. or less, and most preferably about −40° C. or less. Exemplary core materials include siloxanes, silicones, ethylene, propylene, butadiene, acrylates, methacrylates and the like. Preferred core materials contain polysiloxane chains.

The shell is a relatively rigid polymer that contains reactive groups that react with the polyester. Any reactive group that reacts with the reactive groups in the polyester may be used. Preferred reactive groups on the polyester are acid and hydroxyl groups. Exemplary reactive groups on the surface of the shell of the core shell rubber include glycidyl, maleic anhydride, and the like. Preferably the reactive groups on the surface of the shell of the core shell rubber are glycidyl groups. The shell contains a sufficient amount of groups reactive with the polyester to react and maintain substantially all of the core shell rubber into the polyester phase. Most in this context means 50 percent by weight or greater of the core shell rubber, more preferably 60 percent by weight or greater and most preferably 70 percent by weight or greater. Preferably the shell contains monomers with groups reactive with the polyester in a sufficient amount to react and maintain most of the core shell rubber into the polyester phase. Preferably the shell contains monomers with groups reactive with the polyester in an amount of about 1.0 percent by weight or greater and more preferably about 2.0 percent by weight or greater based on the weight of the shell. Preferably the shell contains monomers with groups reactive with the polyester in an amount of about 20.0 percent by weight or less and more preferably about 15 percent by weight or less based on the weight of the shell. Monomers with groups reactive with the polyester include any monomers that can form with other monomers a relatively rigid shell in the core shell rubber and which contain groups reactive with the polyester. Preferred monomers with groups reactive with the polyester include glycidyl acrylates, glycidyl methacrylates, maleic anhydrides and the like, shell further comprises polymer chains derived from one or more monomers that form rigid polymer chains with the monomers with groups reactive with the polyesters. Any monomers which form rigid polymer chains may be utilized. Preferably the monomers polymerize by free radical polymerization. Preferably the monomers are capable of polymerizing in emulsion polymerization processes. Exemplary monomers are alkyl(meth)acrylates, styrene, acrylonitrile, and the like. Examples of preferred alkyl(meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate are particularly preferred. In a preferred embodiment the shell is prepared from alkyl(meth)acrylates, crosslinkers and graft-active monomer units. Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate. The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of about 0.1 to about 20 percent, based on the weight of acrylate rubber component. The preferred graft shell includes one or more (meth)acrylic acid $(C_1-C_8)$-alkyl esters, especially methyl methacrylate copolymerized with glycidyl(meth)acrylate.

In a preferred embodiment the core has grafting sites on its outer surface to facilitate bonding of the shell to the core. The core is a particle having a sufficient size to positively impact the impact properties and the environmental stress crack resistance of the composition of the invention. Preferably the particles size is a median particle size ($d_{50}$ value) of about 0.05 microns or greater and most preferably about 0.1 microns or greater. Preferably the particles size is a median particle size ($d_{50}$ value) of about 5.0 microns or less, even more preferably about 2.0 microns of less and most preferably about 1.0 micron or less. The relative weight ratio of the core and shell are selected to achieve the desired properties of the composition. Preferably the weight ratio of the core to the shell is about 1:99 or greater, more preferably about 2:98 or greater and most preferably 3:97 or greater. Preferably the weight ratio of the core to the shell is about 95:5 or less, more preferably about 90:10 or less and most preferably 80:20 or less.

In one preferred embodiment, the core shell rubber comprises a silicon-containing graft (co)polymer which comprises a core-shell morphology, including a shell that contains polymerized alkyl(meth)acrylate and glycidyl(meth)acrylate grafted to a composite rubber core that contains polyorganosiloxane and poly(meth)alkyl acrylate components, wherein said shell comprises at least 1 to 20 percent by weight glycidyl(meth)acrylate and at least 99 to 80 percent by weight alkyl(meth)acrylate, weight percents based on the weight of the graft shell and the core comprises at least 5 to 85 percent by weight silicon, preferably 5 to 25 percent, and more preferably 5 to 15 percent by weight based on the total weight of the silicon-containing graft (co)polymer. The shell is a rigid phase, preferably copolymerized of glycidyl methacrylate and methylmethacrylate. The level of silicon can be determined by wavelength dispersive x-ray fluorescence (WDXRF) spectrometry, as disclosed in commonly owned patent application PCT/EP 2011/002048 titled CARBONATE BLEND COMPOSITION HAVING IMPROVED RESISTANCE TO ENVIRONMENTAL STRESS CRACKING, relevant passages incorporated herein by reference. In another embodiment, the silicon-containing graft (co)polymer comprises a core of polysiloxane-alkyl(meth)acrylate, sometimes referred to as an interpenetrating network (IPN) type polymer, which contains polysiloxane and butylacrylate. The shell is a rigid phase, preferably polymerized of methylmethacrylate. The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes, as disclosed in PCT/EP 2011/002048 relevant passages incorporated herein by reference. Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference in their entirety. A particularly suitable graft copolymers is available from Mitsubishi Rayon Co., Ltd. as METABLEN™ SX-S2200.

The composition of the invention further comprises one or more flame retardant which are halogenated flame retardants. The halogenated flame retardant is any halogenated flame retardant known for use in polycarbonate based compositions which provide flame retardant properties and which do not negatively impact the impact, heat resistance and environmental stress crack resistance properties of the composition. Preferably the halogenated flame retardant allows the compositions of the invention to achieve the level of properties listed hereinbefore. Preferred classes of flame retardants are brominated flame retardants. Exemplary flame retardants include brominated polycarbonates, such as tetrabromobisphenol A polycarbonate oligomer, polybromophenyl ether, brominated BPA polyepoxide, brominated imides, halogenated polyacrylates, such as poly(haloaryl acrylate), poly(haloaryl methacrylate), brominated polystyrenes such as polydibromostyrene and polytribromostyrene, decabromobiphenyl ethane, tetrabromobiphenyl, brominated alpha, omega-alkylene-bis-phthalimides, such as, N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Mixtures of halogenated flame retardants may be utilized in the compositions of the invention. Exemplary preferred halogenated flame retardants include brominated polyacrylates, brominated polystyrenes and tetrabromobisphenol A polycarbonate oligomers. The halogenated flame retardant may be utilized in a sufficient amount to reduce the flammability of the composition of the invention and to maintain impact the impact, heat resistance and environmental stress crack resistance properties of the composition. Preferably the amount of the halogenated flame retardant allows the compositions of the invention to achieve the level of properties listed hereinbefore. Preferably the one or more halogenated flame retardants are present in an amount of about 0.1 percent by weight or greater based on the weight of the composition of the invention, more preferably about 1 percent by weight or greater and most preferably about 5 percent by weight or greater. Preferably the one or more halogenated flame retardants are present in an amount of about 30 percent by weight or less based on the weight of the composition of the invention and more preferably about 20 percent by weight or less. In a preferred embodiment, the composition of the invention may further comprise a synergist, particularly inorganic antimony compounds. Such compounds are widely available or can be made in known ways. Typical, inorganic synergist compounds include $Sb_2O_5$, $SbS_3$, sodium antimonite and the like. Especially preferred is antimony trioxide ($Sb_2O_3$). Synergists, such as antimony oxides, are typically used at about 0.5 to about 15 by weight percent based on the weight percent of resin in the final composition.

In preferred embodiments the composition of the invention further comprises a fluorinated antidrip agent. Anti drip as used herein means to reduce the tendency of the composition to form burning drips in the event of a fire. Fluorinated polyolefins known in the art as antidrip agents may be used in the compositions of the invention. Fluorinated polyolefins are known and are described, for example, in EP-A 0 640 655. They are marketed, for example, under the brand name Teflon® 30N by DuPont. The fluorinated polyolefins may be employed both in the pure form and in the form of a coagulated mixture of emulsions of the fluorinated polyolefins with emulsions of the graft polymers or with an emulsion of a copolymer, preferably based on styrene/acrylonitrile, the fluorinated polyolefin being mixed as an emulsion with an emulsion of the graft polymer or of the copolymer and the mixture then being coagulated. The fluorinated polyolefins may furthermore be employed as a precompound with the graft polymer (component B) or a copolymer, preferably based on styrene/acrylonitrile. The fluorinated polyolefins are mixed as powders with a powder or granules of the graft polymer or copolymer and the mixture is compounded in the melt in general at temperatures of about 200 to about 330° C. in conventional units, such as internal kneaders, extruders or twin-screw extruders. The fluorinated polyolefins may also be employed in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder, after acidic precipitation and subsequent drying. The coagulates, precompounds or masterbatches conventionally have solids contents of fluorinated polyolefin of about 5 to about 95 weight percent, preferably about 7 to about 60 weight percent. Preferably the one or more anti drip agents are present in an amount of greater than 0 percent by weight or greater based on the weight of the composition of the invention, more preferably about 0.05 percent by weight or greater and most preferably about 0.1 percent by weight or greater. Preferably the one or more anti drip agents are present in an amount of about 5 percent by weight or less based on the weight of the composition of the invention, more preferably about 2 percent by weight or less and most preferably about 1 percent by weight or less.

The composition of the invention may comprise one or more elastomeric polymers for the purpose of improving the notch sensitivity and/or low temperature impact resistance, some of these are commonly referred to as rubbers. Any elastomeric polymer known in the art for use in thermoplastic compositions to improve the notch sensitivity and/or low temperature impact resistance of such compositions may be used in the composition of the invention. In general, such rubber materials have elastic properties and have glass transition temperatures (Tg's) about 0° C. or less, generally about −10° C. or less, preferably about −20° C. or less, and more preferably—about 30° C. or less. Suitable rubbers include the well known homopolymers and copolymers of conjugated dienes, particularly butadiene; as well as other rubbery polymers such as olefin polymers, particularly copolymers of ethylene, propylene and optionally a nonconjugated diene; acrylate rubbers, particularly homopolymers and copolymers of alkyl acrylates having from 4 to 6 carbons in the alkyl group; or block copolymer elastomers, such as styrene alkadiene block copolymers, wherein preferred alkadienes include isoprene and butadiene, and hydrogenated block copolymers. In addition, mixtures of the foregoing rubbery polymers may be employed if desired. Preferred rubbers are homopolymers of butadiene and copolymers thereof with up to about 30 percent by weight styrene. Such copolymers may be random or block copolymers and in addition may be hydrogenated to remove residual unsaturation. Also preferred are rubbery polymers prepared from mono-olefins with optional nonconjugated diene monomers due to their resistance to weathering as compared to conjugated diene rubbers. Where incorporated, the rubbers are preferably grafted with all amount of a graft polymer or selected based on their composition such that they will be located in the carbonate polymer phase. As taught in U.S. Pat. No. 5,087,663, the selection of comonomer type and amount for the monovinylidene aromatic copolymer and grafted rubber composition helps determine whether a selected grafted rubber component will locate in the carbonate polymer phase and/or at the interface of the two phases during the melt mixing of the components. If used, the one or more elastomeric polymers may be present in an amount of about 2 percent by weight or greater, more preferably about 3 percent by weight or greater, and more preferably about than 4 percent by weight or greater based on the weight of the composition of the invention. If used, the one or more elastomeric polymers may be present in an amount of about 25 parts by weight or less, preferably about 15 parts by weight or less, and more preferably about 10 parts by weight or less based on the weight of the composition of the invention.

The composition of the invention contains may further comprise at least one or more additives commonly used in polycarbonate based compositions. For example, one such additive comprises one or more lubricants, for example mineral oil, epoxidized soybean oil, or the like; a mold release agent, such as pentaerythritol tetrastearate; a nucleating agent; an anti-static agent; a stabilizer; a filler and/or a reinforcing material such as glass fibers, carbon fibers, metal fibers, metal coated fibers, thermoset fibers, glass beads, mica, silicates, quartz, talc, titanium dioxide, and/or wollastonite alone or in combinations; a dye; or a pigment. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination and present in an amount effective to inhibit ester-carbonate interchange in the composition.

The composition of the invention may contain a non-halogenated flame retardant in an amount that does not deleteriously impact the chemical resistance properties of articles prepared from the composition of the invention. Exemplary concentration of non-halogenated flame retardant are about 10 weight percent or less and preferably about 8 weight percent by weight or less. Exemplary nonhalogenated flame retardants include phosphorous containing compounds, an oligomeric phosphates, poly(block-phosphonato-esters), and/or a poly(block-phosphonato-carbonates) see U.S. Pat. No. 7,645,850 which is incorporated in its entirety. Preferable oligomeric phosphates include bisphenol-A bis(diphenyl phosphate) (BAPP).

If present, the filler and/or reinforcing material is present in an amount equal to or greater than about 0.5 percent by weight, preferably equal to or greater than about 1 part by weight, more preferably equal to or greater than about 2 percent by weight, more preferably equal to or greater than about 5 percent by weight, and more preferably equal to or greater than about 10 percent by weight based on the weight of the composition. If present, the filler and/or reinforcing material is present in an amount equal to or less than about 60 percent by weight, preferably equal to or less than about 40 percent by weight, more preferably equal to or less than about 30 percent by weight, more preferably equal to or less than about 25 percent by weight, and more preferably equal to or less than about 20 percent by weight based on the weight of the composition.

The compositions of the invention are produced by mixing the particular components in a known manner and melt-compounding and/or melt-extruding them at temperatures of from 200° C. to 300° C. in conventional units such as internal kneaders, extruders and twin-screw extruders. Preferably, the extruder is operated to maintain the blend crystallinity about 9 percent or greater as measured by DSC. The individual components may be mixed in a known manner both in succession and simultaneously and both at approximately 23° C. (room temperature) and at a higher temperature.

By virtue of their excellent ESCR performance, good mechanical properties, in particular impact resistance and elevated heat resistance, the compositions according to the invention are suitable for the production of fabricated articles of any kind, in particular those subject to stringent requirements with regard to mechanical properties and especially requiring good impact resistance and solvent resistance. The compositions of the invention are thermoplastic. When softened or melted by the application of heat, the compositions of this invention can be formed or molded into fabricated articles using conventional techniques such as compression molding, injection molding, gas assisted injection molding, calendaring, vacuum forming, thermoforming, extrusion and/or blow molding, alone or in combination. The ignition resistant polymer compositions can also be fabricated, formed, spun, or drawn into films, fibers, multi-layer laminates or extruded into sheets and/or profiles. Examples of fabricated articles which may be produced are: medical devices of all kinds, enclosures of all kinds, for example for domestic appliances such as juice extractors, coffee machines, food mixers, for office equipment, such as monitors, printers, copiers or cladding sheet for the building sector and automotive components. They may also be used in electrical engineering applications as they have suitable electrical properties.

The carbonate blend compositions according to the invention may furthermore, for example, be used to produce the following fabricated articles or shaped articles: medical applications such as connectors, valves, surgical instruments, trays, lab ware, diagnostics, drug delivery housings, external defibrillators, patient monitoring devices, medical imaging devices, diagnostic equipments, respiratory housings, hospital bed frames and components, interior trim for rail vehicles, interior and exterior automotive applications, enclosures for electrical devices containing small transformers, enclosures for information dissemination and transmission devices, enclosures and cladding for medical purposes, massage devices and enclosures therefore, toy vehicles for children, sheet wall elements, enclosures for safety equipment, hatchback spoilers, thermally insulated transport containers, apparatus for keeping or caring for small animals, articles for sanitary and bathroom installations, cover grilles for ventilation openings, articles for summer houses and sheds, and enclosures for garden appliances. Preferred fabricated articles include housings or enclosures such as for: power tools, appliances, consumer electronic equipment such as TVs, VCRs, DVD players, web appliances, electronic books, etc., or housings or enclosures such as for: information technology equipment such as telephones, computers, monitors, fax machines, battery chargers, scanners, copiers, printers, hand held computers, flat screen displays, etc.

The present invention accordingly also provides the use of the carbonate blend compositions according to the invention for the production of fabricated articles of all kinds, preferably those stated above, and the articles made from the carbonate blend compositions according to the invention.

Illustrative Embodiments of the Invention

The following examples are provided to illustrate the invention, but are not intended to limit the scope thereof. All parts and percentages are by weight unless otherwise indicated.

Materials

PC is a CALIBRE™ 200-10 polycarbonate resin having a weight average molecular weight of 27700 g/mol, available from STYRON LLC.
PET is a polyethylene terephthalate having 0.95 dl/g intrinsic viscosity, available as Traytuf™ 8906 polyester from M&G Polymers.
GMA/MMA-SIL is a core-shell rubber having polydimethylsiloxane core ($T_g$=−120° C.) and poly(methyl methacrylate-co-glycidyl methacrylate) shell ($T_g$=95° C.), available as Metablen™ S2200 from Mitsubishi Rayon. The core/shell weight ratio is approximately 10/90 and the weight percent of glycidyl methacrylate in the shell is about 5 percent.
Irganox is a phenolic antioxidant, available as IRGANOX™ 1076 from BASF.
BAPP is a liquid phosphate ester, available as ADK STAB FP-700 from Adeka.
Brominated polyacrylate, available as FR-1025 from ICL.
BC-52 is a Phenoxy-terminated carbonate oligomer of Tetrabromobisphenol A, available as BC-52™ from Chemtura.
Valox is a polybutylene terephthalate blend, available as Valox™ 364 from SABIC Innovative Plastics.
Bleach is a 50/50 (v/v) mixture of Clorox™ household bleach and deionized water.
Cidex is a 3.4 weight percent solution of glutaraldehyde in water, available as Cidexplus™ from Johnson and Johnson.
Cavicide is a 19.7 percent isopropanol plus 3 percent of a ethylene glycol monobutyl ether solution in water, available as CaviCide® from Metrex.
Wexcide is a 6.43 weight percent solution of organic phenols in water, available as WEX-CIDE, 128 from Wexford Labs. It is used after diluting 128 times in deionized water.
Virex is a 16.894 weight percent solution of quarternary germicides in water, available as Virex™ II 256 from Johnson-Diversey. It is used after diluting 256 times in deionized water, Methods Extrusion Compounding:

Blends are prepared by compounding pre-determined amounts of PC, polyester(s), core-shell rubber, Irganox, UV stabilizer and FR agent in a 25 mm ZSK twin screw extruder. It has 9 heated zones, a feed zone, and a 3.5 mm strand die. The components (powders and granules separately) are dry blended and fed to the extruder through separate gravimetric feeders. Liquid components are added through a liquid pump heated at 80° C. The hoppers of the feeders are padded with nitrogen to minimize air intrusion which could cause oxidative degradation of the polymers. Vacuum is set on the extruder to evacuate any moisture present in the extruder. The extrusion temperature is set to 275° C.

Injection Molding:

Blends are injection molded into ASTM Type-I tensile bars and UL specimen bars (description see below) on 80 tonnes Electrical Demag injection molder. Prior to molding the pellets are dried in a vacuum oven at 120° C. for at least five hours. The melt and mold temperatures in the molder are set to 260° C. and 55° C., respectively. The cycle time is kept constant at approximately 2 minutes.

Test Procedures

Tensile and Impact Strength Measurements:

Tensile testing of the molded ASTM Type-I tensile bars is performed at room temperature on Instron 5565 instrument according to the ASTM D638 method. The notched Izod impact strength is also measured using the ASTM Type-I tensile bars. These measurements are performed at 23° C. according to the ASTM D256 method.

Chemical Resistance Testing:

This test is performed according to ASTM D543-06 method with the ASTM Type-I tensile bars. The bars are first strained by bending over a polished stainless steel slab roughly at their middle section and clamping the ends. Three different levels of strains are applied: 1.0 percent and 1.5 percent; the strain level is controlled by varying the height of the steel slab. The strained bars are then exposed to chemicals by placing a cotton pad on the middle section and soaking the pad with approximately 5 ml of the desired chemical. Thereafter, the bars are kept covered to minimize the evaporation of the chemical. The chemical exposure is continued for three days. Every 24 hours, the cotton pads are changed and soaked with fresh chemical. At the end of three days the cotton pads are removed and the bars are gently wiped with paper towels to remove any residual chemical on the surface. Three bars are tested for each solvent at a given strain.

Tensile testing is performed on the bars according to the ASTM D638 method. The average break stress ($\sigma_{chemical}$) and break strain ($\epsilon_{chemical}$) values for the three bars are calculated. The same tensile test is performed on 3-5 bars that are not exposed to any chemical to measure the actual break stress ($\sigma_{no\ chemical}$) and break strain ($\epsilon_{no\ chemical}$) of the material.

The compatibility of the material with the chemical is rated according to the $\sigma_{chemical}/\sigma_{no\ chemical}$ and $\epsilon_{chemical}/\epsilon_{no\ chemical}$ ratios as follows:

| Rating | Code | $\sigma_{chemical}/\sigma_{no\ chemical}$ | $\epsilon_{chemical}/\epsilon_{no\ chemical}$ |
|---|---|---|---|
| Compatible | C | >=90% | 80-139% |
| Marginal | M | 80-89% | 65-79% |
| Not Compatible | NC | <=79% | <=64% or >=140% |

UL94 testing: Standard specimen bars of 125±5 mm long, 13±0.3 mm wide and 1.6, 2, 2.5 mm and 3 mm thickness are tested according to UL 94 vertical burning test. For the UL 94 vertical burning test, the specimen bars are being clamped vertically. A flame with a height according to UL standard is being held at the bottom of the specimen for 10 seconds. After withdrawal of the flame, the first burning time (T1) is being recorded until extinction of the specimen flame. Immediately after extinction, the burner is placed again under the specimen for another 10 sec and subsequently the second burning time to extinction (T2) is recorded after withdrawal. In addition, it is recorded whether during this burning test, burning specimen drips would ignite cotton placed below the specimen. Five samples are tested and depending on maximum of T1/T2, T1+T2 and burning cotton, classification of V-0, V-1, V-2 and no rating can be given to the specimen according to following conditions:

| UL 94 rating | V-0 | V-1 | V-2 | No Rating |
|---|---|---|---|---|
| Max T1 and Max T2 (5 samples) | ≤10 sec | ≤30 sec | ≤30 sec | ≥30 sec |
| T1 + T2 (5 samples) | ≤50 sec | ≤250 sec | ≤250 sec | ≥250 sec |
| Cotton ignition (5) | No | No | Yes | Yes |

The following compositions are used to prepare samples and tested according to the procedures described hereinbefore. The compositions of Examples 1 to 5 and 6 to 7 are prepared by extrusion compounding. The amounts of each component is in percent by weight

| Example | PC | PET | CSR | Irganox | Uvinul | PTFE | BC-52 | FR1025 | BAPP |
|---|---|---|---|---|---|---|---|---|---|
| 1 | 43.85 | 35 | 10 | 0.2 | 0.15 | 0.8 | 10 | | |
| 2 | 41.85 | 35 | 10 | 0.2 | 0.15 | 0.8 | 12 | | |
| 3 | 46 | 35 | 10 | 0.2 | 0 | 0.8 | 0 | 8 | |
| 4 | 43.85 | 35 | 10 | 0.2 | 0.15 | 0.8 | 0 | 10 | |
| 5 | 43.85 | 35 | 10 | 0.2 | 0.15 | 0.8 | | 8 | 2 |
| Comp 1 Valox360 | | | | | | | | | |
| Comp 2 SABIC CX2244ME | | | | | | | | | |
| Comp 3 | 54.65 | 35 | 10 | 0.2 | 0.15 | | | | |
| Comp 4 | 39 | 35 | 10 | 0.2 | | 0.8 | | | 15 |

Results

Table 1 compares the impact strengths, tensile properties and UL94 performance of inventive examples 1 to 5 with the existing FR PC/Polyester/CSR blends (comparative examples 1 and 2), with a non FR PC/Polyester/CSR blend (comparative example 3) and a phosphate based FR PC/PET/CRS blend (comparative example 4). In general the impact strength, tensile moduli, break stress and elongation at break Examples 1 to 5 exceeds or is comparable to the comparative Examples 1 and 2. Examples 1 to 5 also have similar physical performance versus the same blend composition without a flame retardant (comparative example 3) indicating that using this FR package does not affect the physical properties. However, using a solely phosphorous based flame retardant to obtain the sample level of UL performance (comparative Example 4) will degrade the physical performance like impact and elongation at break.

The UL performance of the comparative examples 1 and 2 is slightly higher versus the Examples 1 to 5. However, both Comparative Examples 1 and 2 are incompatible with certain cleaning and disinfectant agents, as seen in Table 2, in terms of elongation at break retention before and after chemical exposure. Comparative Example 2 is incompatible with all tested agents while Example 1 only at 1.5 percent strain for bleach, WEXCIDE and CAVICIDE. Also at 1 percent strain comparative example 1 is not compatible with CAVICIDE. Examples 1, 2, 3, and 5 remain compatible with all the cleaning and disinfecting agents upon being strained to up to 1.5 percent strain under continuous exposure to them. Example 4 remains compatible with all solvents except for the CAVICIDE where it is marginal compatible in terms of elongation at break retention at 1 and 1.5 percent strain. However, using solely a non halogenated fire retardant (FR) agent to obtain the same UL performance, like in Comparative Example 4, worse chemical resistance against common cleaning agents and disinfectant agents is obtained versus the use of the brominated FR agents and versus the non-halogenated FR containing example, i.e. Comparative Example 3 indicating the ESC performance loss of the use of a conventional non halogenated FR.

Taken together these data show that the new FR PC/Polyester/CSR compositions disclosed here exhibit better chemical resistance against common cleaning and disinfecting agents used for sanitizing medical devices than existing PC/Polyester/CSR products while affording better or comparable impact and mechanical performance properties. Without being bound by theory, we believe this combination of properties is achieved by preferentially dispersing the CSR into the polyester phase by means of having a GMA functionality in the shell of the CSR plus the use of a brominated FR agent.

Table Impact strengths, tensile properties and UL performance of Examples 1 to 5 and Comparative Examples 1 to 4.

| Example | Impact Strength ft-lb/inch (joule) | Modulus MPa | Break Stress MPa | E@Break % | UL-94 performance |
|---|---|---|---|---|---|
| 1 | 15.9 (1.79) | 2266 | 59 | 137 | V-1@3 mm |
| 2 | 16.8 (1.90) | 2279 | 60 | 136 | V-0@2.5 mm |
| 3 | 17.3 (1.95) | 2102 | 55 | 132 | V-1@3 mm |
| 4 | 12.6 (1.42) | 2225 | 44 | 71 | V-0@2.5 mm V-1@1.6 mm |
| 5 | 15.4 (1.74) | 2170 | 42 | 97 | V-0@2.5 mm V-1@1.6 mm |
| Comp 1 | 14.0 (1.58) | 1860 | 40 | 70 | V-0@1.5 mm |
| Comp 2 | 13.1 (1.48) | 2600 | 58 | 100 | V-0@0.75 mm |
| Comp 3 | 17.5 (1.98) | 2101 | 56 | 138 | HB @ 1 mm |
| Comp 4 | 6.2 (0.70) | 2501 | 43 | 28 | V-1@3 mm |

TABLE 2

Chemical resistance of Examples 1 and 2, and Comparative Examples 1 and 2 against cleaning and disinfecting agents

| | | Cleaning Agent | | | | | | | | | |
|---|---|---|---|---|---|---|---|---|---|---|---|
| | | 50% Bleach | | CIDEX Plus | | WEXCIDE 128 | | CAVICIDE | | VIREX 256 | |
| | Data | Applied Strain | | | | | | | | | |
| Example | Type | 1.0 | 1.5 | 1.0 | 1.5 | 1.0 | 1.5 | 1.0 | 1.5 | 1.0 | 1.5 |
| 1 | Stress | C | C | C | C | C | C | C | C | C | C |
| 1 | Strain | C | C | C | C | C | C | C | C | C | C |
| 2 | Stress | C | C | C | C | C | C | C | C | C | C |
| 2 | Strain | C | C | C | C | C | C | C | C | C | C |
| 3 | Stress | C | C | C | C | C | C | C | C | C | C |
| 3 | Strain | C | C | C | C | C | C | C | C | C | C |
| 4 | Stress | C | C | C | C | C | C | C | M | C | C |
| 4 | Strain | C | C | C | C | C | C | NC | NC | C | C |
| 5 | Stress | C | C | C | C | C | C | C | C | C | C |
| 5 | Strain | C | C | C | C | C | C | C | C | C | C |
| Comp 1 | Stress | C | NC | C | C | NC | NC | NC | C | C | C |
| Comp 1 | Strain | C | C | C | C | C | C | C | C | C | C |
| Comp 2 | Stress | C | C | C | C | NC | NC | NC | NC | NC | NC |
| Comp 2 | Strain | NC | NC | NC | NC | NC | NC | NC | NC | NC | NC |
| Comp 3 | Stress | C | C | C | C | C | C | C | C | C | C |
| Comp 3 | Strain | C | C | C | C | C | C | C | C | C | C |
| Comp 4 | Stress | C | C | C | M | C | C | NC | NC | NA | NC |
| Comp 4 | Strain | C | C | M | C | M | NC | NC | NC | NA | NC |

Parts by weight as used herein refers to 100 parts by weight of the composition specifically referred to. In most cases, this refers to the adhesive composition of this invention. The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Parts by weight as used herein refers to compositions containing 100 parts by weight. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising:
   a) from about 25 to about 75 weight percent of one or more polycarbonates prepared from diphenols selected from the group of hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyphenyl) ethers, bis(hydroxyphenyl)sulfoxides, bis(hydroxyphenyl)ketones, bis(hydroxyphenyl)sulfones and 4,4"-bis(hydroxyphenyl)diisopropylbenzenes, wherein the polycarbonates have a weight average molecular weight of about 15,000 to about 200,000 grams/mole and a melt flow rate of about 3 to about 20 grams per 10 minutes as determined at 300° C. under a load of 1.2 kg;
   b) from about 5 to about 65 weight percent of one or more polyesters having a crystallinity of about 25 to about 60 percent by weight of the polyesters;
   c) greater than 0 to about 50 percent by weight of one or more core shell rubbers having glycidyl groups on the surface of the shell wherein the core comprises one or more polysiloxanes and the shell comprises one or more polymers comprising glycidyl acrylate or glycidyl methacrylate in an amount of about 2 to about 20 percent by weight of the shell; and
   d) about 0.1 to about 30 percent by weight of one or more brominated fire retardant agents;

wherein the polycarbonates and polyesters form separate phases, the polycarbonate phase is the continuous phase, and the core shell rubber is located in the polyester phase, wherein percent by weight of the components of the composition is based on the weight of the composition.

2. A composition according to claim 1 which further comprises a fluoropolymer capable of functioning as an anti-drip agent.

3. A composition according to claim 1 wherein the composition exhibits a flame retardant rating according to UL-94 at V-0 of 3.0 mm or less; a notched Izod impact strength of about 8 foot pounds per inch or greater and chemical resistance according to ASTM D543-06 to one or more of the cleaning compositions selected from bleach, polyethylene glycol, a mixture of aryl substituted phenols and aryl substituted chlorophenols, a mixture of an alkanol and a monoalkyl ether of ethylene glycol, and one or more ammonium chlorides having four alkyl and/or aryl ligands.

4. A composition according to claim 1 wherein at least a portion of the glycidyl groups on the surface of the core shell rubbers are reacted with functional groups of the one or more polyesters.

5. A composition according to claim 1 wherein the core shell rubber comprises a core of one or more polymers having a glass transition temperature of about 0° C. or less and a shell of one or more polymers having a glass transition temperature of about 25° C. or greater.

6. A composition according to claim 1 wherein the one or more polyesters is one or more aliphatic polyesters and aromatic polyesters.

7. A composition according to claim 1 wherein the one or more polycarbonates comprise one or more linear polycarbonates and/or branched polycarbonates.

8. A molded article comprising a composition according to claim 1.

9. A method of preparing a molded article comprising passing a composition according to claim 1 through a zone with shearing at a temperature of about 150° C. to about 400° C. and molding the resulting mixture into a desired shape.

10. A method according to claim 9 wherein the zone with shearing is one or more zones of an extruder.

11. A method according to claim 10 wherein the mixture is molded into a desired shape by injection molding.

12. A method according to claim 10 wherein water is excluded from the zone with shearing.

13. A composition according to claim 1 wherein the composition further comprises an inorganic antimony compound.

14. A method according to claim 9 wherein the composition further comprises an inorganic antimony compound.

15. A composition according to claim 1 wherein the one or more polyesters is one or more aromatic polyesters.

16. A method according to claim 9 wherein the one or more polyesters is one or more aromatic polyesters.

17. A composition comprising:
a) from about 25 to about 75 weight percent of one or more polycarbonates prepared from diphenols selected from the group of hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyphenyl) ethers, bis(hydroxyphenyl)sulfoxides, bis(hydroxyphenyl)ketones, bis(hydroxyphenyl)sulfones and 4,4"-bis(hydroxyphenyl)diisopropylbenzenes, wherein the polycarbonates have a weight average molecular weight of about 15,000 to about 200,000 and a melt flow rate of about 3 to about 20 grams per 10 minutes as determined at 300° C. under a load of 1.2 kg;
b) from about 5 to about 65 weight percent of one or more polyesters having a crystallinity of about 25 to about 60 percent by weight of the polyesters;
c) from about 5 to about 15 percent by weight of one or more core shell rubbers having glycidyl groups on the surface of the shell wherein the core comprises one or more polysiloxanes and the shell comprises one or more polymers comprising glycidyl acrylate or glycidyl methacrylate in an amount of monomer in an amount of about 2 to about 20 percent by weight of the shell; and
d) about 0.1 to about 30 percent by weight of one or more brominated fire retardant agents;
wherein the polycarbonates and polyesters form separate phases, the polycarbonate phase is the continuous phase, and the core shell rubber is located in the polyester phase, the blend has a crystallinity of about 9 percent or greater as measured by DSC, wherein percent by weight of the components of the composition is based on the weight of the composition.

18. A composition according to claim 17 wherein the one of more core shell rubbers have a core with a particle size of about 0.05 to about 5 Microns.

19. A composition according to claim 17 which comprises about 0.05 to about 5 percent by weight or fluoropolymer capable of functioning as an anti-drip agent and from about 0.5 to about 15 percent by weight of an inorganic antimony compound.

* * * * *